(12) United States Patent
Matthias

(10) Patent No.: US 9,034,507 B2
(45) Date of Patent: May 19, 2015

(54) ARRANGEMENT HAVING AT LEAST ONE BATTERY

(75) Inventor: Wolf Matthias, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 786 days.

(21) Appl. No.: 12/663,667

(22) PCT Filed: May 5, 2008

(86) PCT No.: PCT/EP2008/055453
§ 371 (c)(1),
(2), (4) Date: Dec. 8, 2009

(87) PCT Pub. No.: WO2009/000583
PCT Pub. Date: Dec. 31, 2008

(65) Prior Publication Data
US 2010/0173179 A1    Jul. 8, 2010

(30) Foreign Application Priority Data

Jun. 27, 2007  (DE) .......................... 10 2007 029 744

(51) Int. Cl.
| | |
|---|---|
| *H01M 10/44* | (2006.01) |
| *H01M 2/10* | (2006.01) |
| *H01M 10/052* | (2010.01) |
| *H01M 4/58* | (2010.01) |

(52) U.S. Cl.
CPC .......... *H01M 10/443* (2013.01); *H01M 2/1022* (2013.01); *H01M 4/5825* (2013.01); *H01M 10/052* (2013.01); *Y02E 60/122* (2013.01)

(58) Field of Classification Search
CPC ...................................................... H01M 10/44
USPC ............................................................. 429/7
See application file for complete search history.

(56) References Cited

U.S. PATENT DOCUMENTS

2003/0134183 A1    7/2003    Iwasaki et al.
2007/0031732 A1 *  2/2007    Chiang et al. ............ 429/231.95

FOREIGN PATENT DOCUMENTS

| CN | 1457542 A   |   | 11/2003 |
|----|-------------|---|---------|
| EP | 1353429     | * | 10/2003 |
| EP | 1353429 A1  |   | 10/2003 |
| FR | 2731113 A1  |   | 8/1996  |
| JP | 20037285 A  |   | 1/2003  |

\* cited by examiner

*Primary Examiner* — Ula C Ruddock
*Assistant Examiner* — Jacob Marks
(74) *Attorney, Agent, or Firm* — Kenyon & Kenyon LLP

(57) ABSTRACT

A battery pack having at least one battery with two electrical contacts in which a parallel circuit comprising a first and a second resistor is arranged between a first contact and a first pole, the first resistor switches off at a first temperature, the second resistor switches off at a second temperature, the first temperature is higher than the second temperature, and the first resistor has a higher current carrying capability than the second resistor. The circuit serves as fuse protection for the battery against overheating both when the battery is charging and when the battery is discharging.

22 Claims, 2 Drawing Sheets

ARRANGEMENT HAVING AT LEAST ONE BATTERY

CROSS-REFERENCE TO RELATED APPLICATIONS

This application is a 371 application of PCT/EP2008/055453 filed on May 5, 2008.

BACKGROUND OF THE INVENTION

1. Field of the Invention

The invention is based on an arrangement having at least one battery, in particular in the form of a rechargeable battery pack for a handheld power tool.

2. Description of the Prior Art

Modern handheld power tools, such as handheld power drills or cordless screwdrivers, are often supplied with current by means of rechargeable battery packs, and the rechargeable battery packs have a plurality of storage cells that are connected electrically to one another, being held together for instance by a plastic sheathing.

In the operation of such rechargeable battery packs, it is necessary for the memory cells to be protected against overheating.

BRIEF SUMMARY OF THE INVENTION

The invention includes the general technical teaching of providing a parallel circuit of two temperature-sensitive resistors between one pole of the battery and an electrical contact of the arrangement. A first resistor is provided that switches at a first temperature. A second resistor is also provided, which switches at a second temperature, and the first temperature is higher than the second.

In this way, a simple possibility is furnished of enabling individual adaptation of the switching temperature at which the electrical connection between the battery and the electrical contact is interrupted. Moreover, because of the parallel circuit of the resistors, the total resistance is relatively low.

In a further embodiment, the first resistor has a higher current-carrying capacity than the second resistor.

In a further embodiment, the battery is embodied as a chargeable battery.

In a further embodiment, the battery has lithium ions. Preferably, the cathode of the battery has lithium iron phosphate. With the described arrangement of the parallel circuit of the resistors, it is possible to provide simple fuse protection against overheating of the batteries that have lithium ions.

In a further embodiment, the first and/or the second resistor is embodied as a PTC resistor, whose electrical resistance increases with the temperature and increases abruptly at a switching temperature.

In a further preferred embodiment, the chargeable battery is charged and discharged via the first and second electrical contacts. Thus only the two electrical contacts are provided for electrically contacting the chargeable battery. In this way, the thermal fuse protection by means of the parallel circuit of the first and second resistor acts not only when current is being output but also when current is being taken up when the battery is being charged.

DETAILED DESCRIPTION OF THE INVENTION

Figure 1:
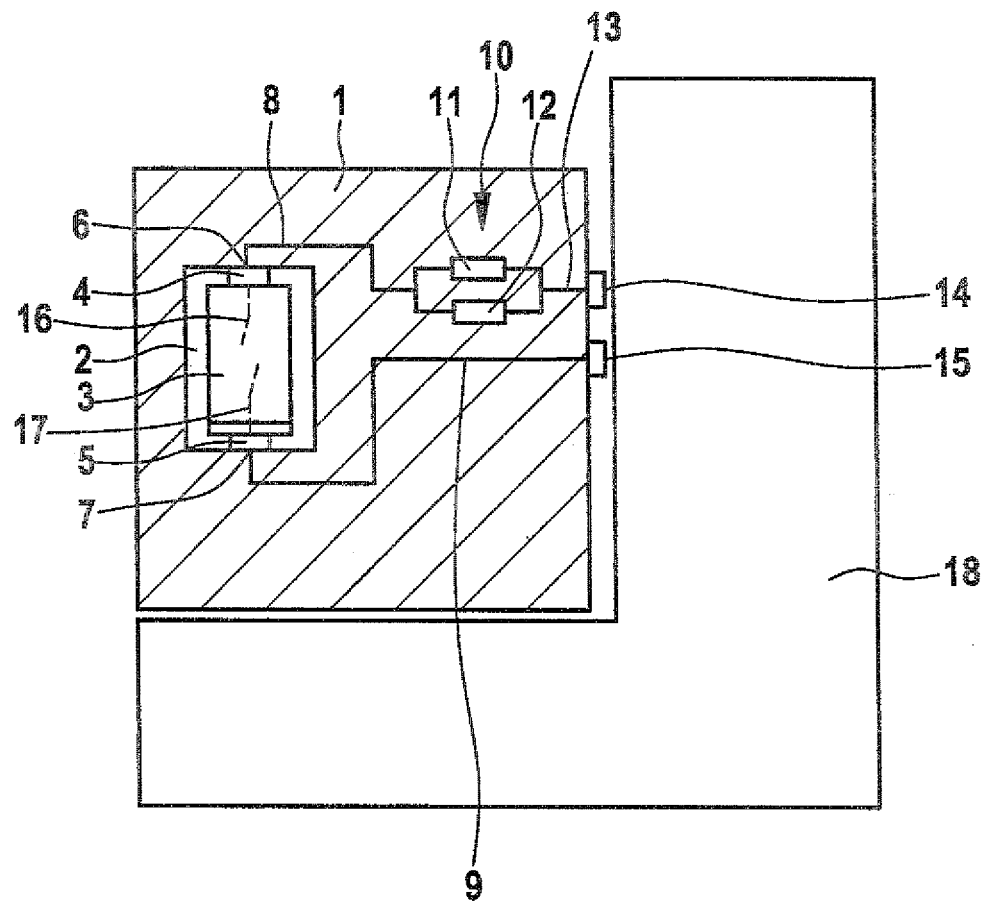
FIG. 1, a schematic illustration of an arrangement having a battery.

FIG. 1 shows a housing 1 with a receptacle 2. A battery 3 is disposed in the receptacle 2. The battery 3 has a positive pole 4 and opposite it a negative pole 5. The positive pole 4 is a first pole, which is connected to a cathode. The negative pole 5 is a second pole, which is connected to an anode 17. The positive pole 4 is located at a first counterpart contact 6, which is disposed in the housing 1 adjoining the receptacle 2, in the vicinity of the positive pole 4 of the battery. The negative pole 5 is located at a second counterpart contact 7, which is disposed in the housing 1 adjoining the receptacle 2 in the vicinity of the negative pole 5. The first counterpart contact 6 is connected to a first electrical line 8. The first line 8 connects the first counterpart contact 6 to a parallel circuit 10 of a first and second resistor 11, 12. The parallel circuit 10 is in communication with a third line 13, which connects the parallel circuit 10 with a first electrical contact 14 that is embodied on the outside of the housing 1.

Via a second electrical line 9, the second counterpart contact 7 is in communication with a second electrical contact 15, which is likewise embodied on an outside of the housing 1. The first and second electrical contacts 14, 15 are provided for electrically contacting the housing 1. The housing 1 can be used for instance in an electrical device, such as a handheld power tool, for instance a screwdriver or a power drill. The electrical contacting between the motor of the handheld power tool and the battery 3 is established via the electrical contacts 14, 15. In a further embodiment, in which the battery 3 is embodied as a chargeable battery, the first and second electrical contacts 14, 15 also serve the purpose of electrical contacting a charger with which the electrical battery 3 is charged. In this embodiment, the housing 1 with the chargeable battery 3 is a rechargeable battery pack. Depending on the embodiment selected, one or more batteries 3 may be embodied in the housing 1. To increase the electrical voltage at the electrical contacts 14, 15 when more than one battery 3 is provided, the batteries 3 are connected electrically in series in the housing 1, so that the voltages of the batteries 3 add up, and a correspondingly increased output voltage is present at the first and second electrical contacts 14, 15.

The first and second resistors 11, 12, in the embodiment shown, are disposed between the positive pole 4 and the first electrical contact 14. Depending on the embodiment selected, the parallel circuit of the first and second resistors 11, 12 can also be disposed between the negative pole and the second electrical contact 15.

The parallel circuit of the first and second resistors 11, 12 serves as fuse protection for the battery 3 against overheating. For this purpose, temperature-sensitive resistors or so-called PTC resistors, whose electrical resistance increases with increasing temperature, are disposed as the first and second resistors 11, 12. Depending on the selected embodiment of the PTC, the first and second resistors can have a resistance behavior that beyond a certain temperature increases very sharply, so that no further current conduction takes place in the sense of a power transmission. The temperatures at which the resistances of the first and second resistors 11, 12 rise very sharply are selected differently. The abbreviation PTC stands for positive temperature coefficient.

In the selected embodiment, the first resistor 11 is switched in disabling fashion at a first switching temperature of the first resistor 11. The second resistor 12 is switched in disabling fashion at a second switching temperature, and the first temperature is higher than the second temperature. Furthermore, the first resistor has a higher current-carrying capacity than the second resistor. In this way, it is possible to employ a first resistor whose switching temperature is located up to a few degrees above the temperature desired for protection of the battery. On the other hand, a second resistor can be used, whose switching temperature is in the range which is desired for protection of the battery but whose current-carrying capacity is not sufficient to conduct the appropriate current from or to the battery. The high current-carrying capacity that is desired for the operation of the battery is furnished by the first resistor 11.

The battery 3 may for instance be embodied in the form of a chargeable battery, that is, a rechargeable battery, which for instance has lithium ions. In the further embodiment, lithium iron phosphate may be embodied in the cathode of the chargeable battery. A chargeable battery with lithium ions and with lithium iron phosphate as an ingredient in the cathode material has the advantage that the chargeable battery is relatively invulnerable to overheating. In this way, it is possible to protect against overheating of the chargeable battery with the simple protective circuit described, in the form of a parallel circuit of the first and second resistors.

Figure 2:
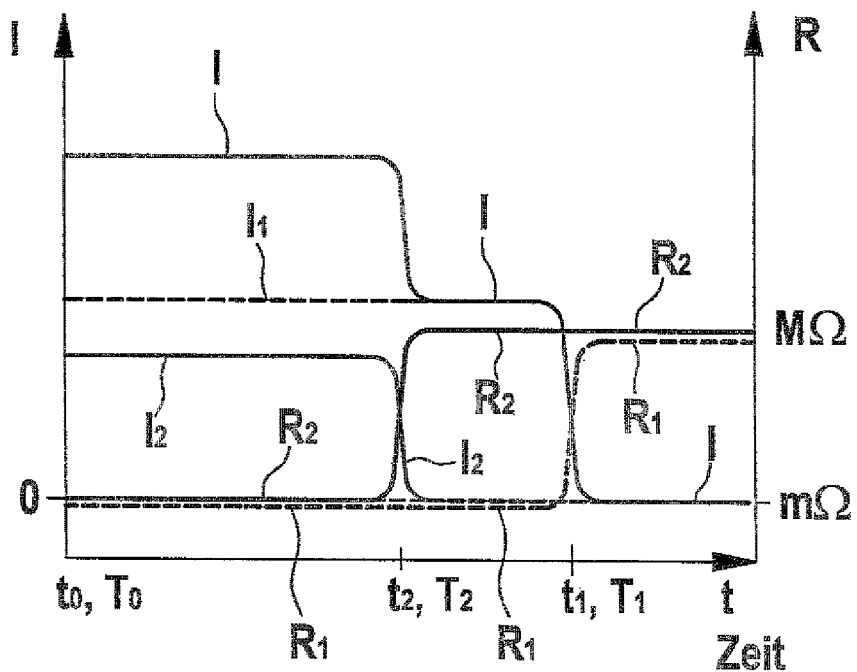
FIG. 2, a schematic illustration of a characteristic current curve in operation of the battery.

FIG. 2, in a schematic illustration, shows a situation in which current from the battery 3, in this case a chargeable battery 3, is output or is being taken up during charging. The graph in FIG. 2 shows the development over time of a current I which is plotted on a Y axis on the left, with the time t extending along the X axis. The resistance R for the first and second resistors is plotted on a Y axis on the right.

At the starting time t0, the temperature prevails, and a total current I flows via the parallel circuit. The total current I splits into a first partial current I1 of the first resistor 11 and a second partial current I2 of the second resistor 12. The two partial currents I1 and I2 add together to make the total current I. The total current I is represented by a solid line, the first partial current I1 by a dashed line, and the second partial current I2 again by a solid line. Between the starting time t0 and a first time t1, the resistances of the first resistor 11 and of the second resistor 12 are also low; the electrical resistance of the first resistor 11 is shown as a dashed line, and the electrical resistance of the second resistor 12 is shown as a solid line. The temperature rises from the starting temperature T0 to the second temperature T2 at the second time t2. The second temperature T2 represents the switching temperature of the second resistor 12, at which the electrical resistance R2 of the second resistor 12 rises very sharply to a disabling value and makes no further power transmission possible for the electric power line.

In the exemplary embodiment shown, the disabling value is in the range of 11Ω. Because of the sharp rise in the electrical resistance of the second resistor at the second temperature T2, the total current I of the parallel circuit drops at the second temperature T2 to the first current I1 of the first resistor 11, which is still conducting both at and beyond the second temperature T2.

If the temperature of the battery 3 now continues to rise, then between the second temperature T2 and the first temperature T1 the battery 3 is supplied with current only via the first resistor 11. If the battery 3 reaches the first temperature T1, which corresponds to the switching temperature of the first resistor 11, then the resistance R1 of the first resistor 11 also rises very sharply and attains a value which makes no further current conduction possible in the sense of the power transmission. In the exemplary embodiment shown, the disabling value of the first resistor 11 is similar to the disabling value of the second resistor 12, which in this exemplary embodiment is in the range of 11Ω. Because of the disabling circuit of the first resistor 11 when the first temperature T1, which represents the switching temperature for the first resistor, is reached, the total current I that flows the via the parallel circuit 10 of the first and second resistors 11, 12 drops down nearly to 0 A. Thus the electrical contact between the first electrical contact 14 and the positive pole 4 of the battery 3 is switched in disabling fashion.

The first and second resistors 11, 12 are thermally coupled to the battery 3, for instance by means of a suitable close arrangement of the first and second resistors 11, 12 at the battery 3 and/or by the arrangement of a heat-conducting material between the battery 3 and the first and second resistors 11, 12.

By means of the described arrangement, it is possible to use a first resistor which has a switching temperature, for switching between a conducting state and a disabling state, that is above the temperature desired for protection of the battery 3. The first switching temperature of the first resistor can be up to several ° C. above the protection temperature of the battery. Furthermore, a second resistor is provided, which has a sufficiently high current-carrying capacity and whose switching temperature between a conducting state and a disabling state is however below the desired switching temperature for the thermal fuse protection of the battery. By the disabling of the second resistor, it is attained that an increased current flow takes place through the first resistor, and thus by the intrinsic heating of the first resistor, the temperature in the first resistor rises to above the temperature of the battery, and thus the switching temperature of the first resistor is reached even though the temperature of the battery 3 is still below the switching temperature of the first resistor, and no damage to the battery 3 from overheating is possible. Thus the additional intrinsic heating of the first resistor 11 is utilized by the switching in disabling fashion of the second resistor 12 in order to reach the switching temperature of the first resistor 11 even though the temperature of the battery is still below that.

Depending on the embodiment selected, it is also possible for more than two resistors to be provided in the parallel circuit 10.

In the illustration in FIG. 2, the actual temperature of the battery 3 after the switching in disabling fashion of the second resistor 2 is below the temperature of the first resistor 11; in particular, when the first switching temperature of the first resistor is reached, the temperature of the battery 3 is still below the maximum permissible temperature, or in other words is at least 1° C. or several ° C. below the temperature of the first resistor 11.

Figure 3:
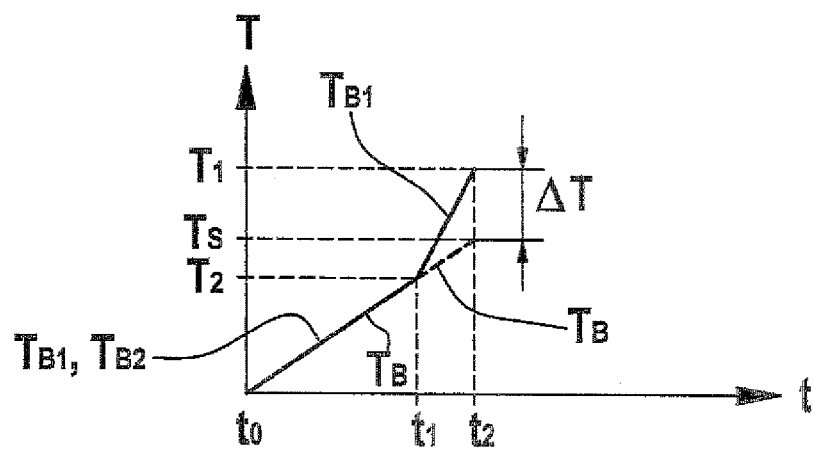
FIG. 3, a temperature graph.

FIG. 3 shows a timing graph of the temperatures TB1, TB2, TB of the first resistor 11, second resistor 12, and battery 3, plotted over time T. TB1 indicates the temperature of the first resistor 11; TB2 is the temperature of the second resistor 12; and TB is the temperature of the battery. Between the starting time T0 and a first time t1 at which the current is carried via the parallel circuit 10, the temperature TB1, TB2, TB at the first and second resistors 11, 12 and in the battery 3 rises approximately identically. This is indicated in the graph in the form of a solid line. At the first time t1, the switching temperature T2 of the second resistor 12 is reached, and the second resistor 12 is switched in disabling fashion. At that time, the entire current then flows via the first resistor 11. As a consequence, the temperature TB1 of the first resistor 11, which is shown as a solid line, rises more sharply than the temperature TB in the battery 3, which is shown as a dashed line. At the second time t2, the temperature of the first resistor 11 reaches the switching temperature T1 of the first resistor 11, even though the temperature of the battery 3 is still markedly below the switching temperature of the first resistor 11. It is thus possible to furnish a protection circuit to prevent overheating of the battery with two PTC resistors, whose switching temperatures are not identical to the temperature at which the battery must be protected against overheating. Depending on the selected embodiment, a first resistor 11 can also be used which has precisely the switching temperature TS at which the battery 3 must be protected against overheating. In that embodiment, the parallel circuit of the first and, second resistors offers the advantage that the total resistance is markedly reduced.

For example, the switching temperature of the first resistor is between 0.5 and 5° higher than the desired shutoff temperature of the battery 3. The shutoff temperature of the second resistor 12 is for instance between 0.5 and 5° lower than the desired shutoff temperature of the battery 3.

During the time when the first and second resistors 11, 12 are conducting, the current load is distributed inversely proportionally to the internal resistances of the first and second resistors 11, 12. Thus until the switching temperature of the second resistor 12 is reached, the battery 3, in particular in the embodiment as a chargeable battery 3 or in other words a rechargeable battery, can be operated normally. Even after the switching temperature of the second resistor 12 is exceeded, a current output from or current supply to the chargeable battery 3 is possible. After the switching in disabling fashion of the second resistor 12, the total current flows via the first resistor 11. As a result, the first resistor 11 experiences additional intrinsic heating and as a result relatively quickly reaches its own shutoff temperature, so that the current flow is completely interrupted.

The invention claimed is:

1. An arrangement comprising:
    at least one battery with two electrical contacts, a first electrical contact being connected to a first pole of the battery, and a second electrical contact being connected to a second pole of the battery; and
    a parallel circuit comprising a first resistor and a second resistor and disposed between the first contact and the first pole;
    wherein the first resistor switches in disabling fashion at a first temperature, the second resistor switches in disabling fashion at a second temperature, the first temperature is higher than the second temperature, and the first resistor has a higher current-carrying capacity than the second resistor, wherein the first temperature is between 0.5° C. and 5° C. higher than a protection temperature of the battery.

2. The arrangement according to claim 1, wherein the battery is a chargeable battery.

3. The arrangement according to claim 2, wherein the battery has lithium ions.

4. The arrangement according to claim 3, wherein a cathode of the battery has lithium iron phosphate.

5. The arrangement according to claim 4, wherein at least one of the first resistor and the second resistor are resistors whose resistance increases with temperature.

6. The arrangement according to claim 5, wherein the chargeable battery is charged and discharged via the first and second contacts.

7. The arrangement according to claim 6, wherein the protection temperature, at which the arrangement electrically insulates the battery, is located between the first temperature and the second temperature, at which the first and second resistors switch in disabling fashion.

8. The arrangement according to claim 1, wherein the battery is charged and discharged via the first and second contacts.

9. The arrangement according to claim 1, wherein at least one of the first resistor and the second resistor are resistors whose resistance increases with temperature.

10. The arrangement according to claim 1, wherein the protection temperature, at which the arrangement electrically insulates the battery, is located between the first temperature and the second temperature, at which the first and second resistors switch in disabling fashion.

11. The arrangement according to claim 1, wherein the first and second resistors are arranged in parallel with each other to form a parallel circuit.

12. The arrangement according to claim 11, wherein the parallel circuit serves as fuse protection for the battery against overheating.

13. The arrangement according to claim 12, wherein the protection temperature, at which the arrangement electrically insulates the battery, is located between the first temperature and the second temperature, at which the first and second resistors switch in disabling fashion.

14. The arrangement according to claim 1, wherein the battery is a chargeable battery; the first and second resistors are arranged in parallel with each other to form a parallel circuit; and the parallel circuit serves as fuse protection for the battery against overheating both when the battery is charging and when the battery is discharging.

15. The arrangement according to claim 14, wherein the protection temperature, at which the arrangement electrically insulates the battery, is located between the first temperature and the second temperature, at which the first and second resistors switch in disabling fashion.

16. The arrangement according to claim 14, wherein at least one of the first resistor and the second resistor are resistors whose resistance increases with temperature.

17. An arrangement comprising:
    at least one battery with two electrical contacts, a first electrical contact being connected to a first pole of the battery, and a second electrical contact being connected to a second pole of the battery; and
    a parallel circuit comprising a first resistor and a second resistor and disposed between the first contact and the first pole;
    wherein the first resistor is a resistor having a resistance that increases with temperature and that has a first disabling resistance value and switches in disabling fashion at a first temperature, the second resistor is a resistor having a resistance that increases with temperature and that has a second disabling resistance value and switches in disabling fashion at a second temperature, the first temperature is substantially equal or higher than a protection temperature of the battery and the second temperature is lower than the first temperature and the protection temperature, the first resistor has a higher current-carrying capacity than the second resistor, and the first disabling resistance value is similar to the second disabling resistance value;
    wherein the parallel circuit is configured to one of supply and carry a total current which is split into a first partial current via the first resistor and a second partial current via the second resistor up to the second temperature, and, above the second temperature and below the first temperature, to one of supply and carry the total current via the first resistor, and, above the first temperature, to one of supply and carry substantially no current, wherein the first temperature is between 0.5° C. and 5° C. higher than the protection temperature.

18. The arrangement according to claim 1, wherein both the first resistor and the second resistor are resistors whose resistance increases with temperature.

19. The arrangement according to claim 17, wherein both the first resistor and the second resistor are resistors whose resistance increases with temperature.

20. The arrangement as defined in claim 17, wherein the first resistor and the second resistor are PTC resistors.

21. The arrangement as defined in claim 17, wherein the first resistor and the second resistor are thermally coupled to the battery.

22. An arrangement comprising:
at least one battery with two electrical contacts, a first electrical contact being connected to a first pole of the battery, and a second electrical contact being connected to a second pole of the battery; and
a parallel circuit comprising a first resistor and a second resistor and disposed between the first contact and the first pole;
wherein the first resistor is a resistor having a resistance that increases with temperature and that has a first disabling resistance value and switches in disabling fashion at a first temperature, the second resistor is a resistor having a resistance that increases with temperature and that has a second disabling resistance value and switches in disabling fashion at a second temperature, the first temperature is substantially equal or higher than a protection temperature of the battery and the second temperature is lower than the first temperature and the protection temperature, the first resistor has a higher current-carrying capacity than the second resistor, and the first disabling resistance value is similar to the second disabling resistance value;
wherein the parallel circuit is configured to one of supply and carry a total current which is split into a first partial current via the first resistor and a second partial current via the second resistor up to the second temperature, and, above the second temperature and below the first temperature, to one of supply and carry the total current via the first resistor, and, above the first temperature, to one of supply and carry substantially no current, wherein the second temperature is between 0.5° C. and 5° C. lower than the protection temperature.

\* \* \* \* \*